Nov. 22, 1966 J. H. LAUE 3,286,629
MULTI-MISSION MODULE
Filed Oct. 7, 1964 4 Sheets-Sheet 1

INVENTOR.
JAY H. LAUE

BY

ATTORNEYS

INVENTOR.
JAY H. LAUE

ATTORNEYS

Nov. 22, 1966     J. H. LAUE     3,286,629
MULTI-MISSION MODULE
Filed Oct. 7, 1964     4 Sheets-Sheet 4

INVENTOR.
JAY H. LAUE

BY

ATTORNEYS

United States Patent Office 3,286,629
Patented Nov. 22, 1966

3,286,629
MULTI-MISSION MODULE
Jay H. Laue, Huntsville, Ala., assignor to the United States of America as represented by the Administrator of the National Aeronautics and Space Administration
Filed Oct. 7, 1964, Ser. No. 402,365
2 Claims. (Cl. 102—49)

The invention described herein may be manufactured and used by or for the Government of the United States of America for Governmental purposes without the payment of any royalties thereon or therefor.

This invention relates to a new and novel concept for the design of a stage for a rocket propelled space vehicle which is capable of performing a number of different missions. More particularly the invention relates to a stage of a rocket powered space vehicle in which a portion of its components are immutable in size and in relationship to one another, while other of the components of the stage are changeable so that it may be utilized to perform many different missions of space exploration.

As the exploration of space progresses, the number and variety of missions increase. The array of mission possibilities has made it very expensive momentarily and manpower-wise to design and construct the specialized stage systems required to bridge the velocity gap between the earth orbital or escape payload capability of our present rocket vehicles and the terminal maneuver and characteristic velocity requirements for deep space missions of the future. This terminal phase is entirely dependent on the mission. It may require only a relatively simple velocity stage, but on the other hand a complex landing stage may be required for some special missions. The practice of designing and developing a totally unique and optimum terminal stage for each major mission is leading to staggering costs and excessive manpower and resource requirements in the national space program.

In conventional approaches to stage design, the structural elements and functions are intimately integrated with the propulsion system. This is the case, for example, where the propulsion system propellant tanks are designed to be the load-bearing structural elements in the stage. For this conventional design approach a change in the basic mission, with its probable change in propellant loading, upper body weight, and bending moment characteristics can have a profound influence on the tanks, as structural elements, which might complicate or penalize the propellant tank system in its dual role as a propulsion sub-system.

The above enumerated disadvantages of the use of a unique terminal stage for each major mission has spurred a search for a "missing-link" terminal stage which can work with an anticipated booster vehicle and provide the terminal propulsive requirements of a group of missions. The Multi-Mission Modular Stage is the outgrowth of the search.

The Multi-Mission Modular Stage envisions a single, all purpose hardware entity, utilizing a true building block approach. Ideally, the hardware entity consists of an unchangeable collection of all the propulsive and structural elements which can be physically standardized and still meet the functional requirements of a wide variety of missions. While it is not possible to standardize all the elements of the stage it has been found possible to standardize a majority of the elements which in combination with a few changeable items provides a stage which can be utilized in a wide variety of space missions.

The stage generally consists of a plurality of tanks containing the requisite propellants and preferably a plurality of rocket engines although it is obvious that a single engine could be successfully utilized. Spheroidal, torodial, ellipsoidal, prolate spheroidal, and other tank shapes may be used in the Multi-Mission Modular Stage. However, a conventional cylindrical type with semi-ellipsoidal bulkheads is the preferred shape since the total propellant volume of such tanks is a function of the propellant tank cyclindrical length. For tanks of a given diameter and bulkhead configuration the propellant volume can be adapted to the exact loading requirements of the mission by simply changing the length of the cylindrical sections of the tanks. Besides their volumetric flexibility, the cylindrical tank designs are preferable for the module concept because they offer simplicity, ease of fabrication, and known fluid dynamics and outage characteristics. Furthermore, the simple cylindrical tank geometry is among the best from the standpoint of minimizing overall modular stage length. Stage compactness is an especially important design consideration in nearly all potential applications of a multi-mission modular stage because launch vehicle stiffness and bending frequency characteristics are less pronounced for the shorter vehicle configurations.

The immutable hardware items for the stage include the rocket engines, the thrust structure connecting the engines to the stage support rings, the thrust vector control system, the propellant tank bulkheads, and the propellant feed systems ducting interconnecting the engines and the tank, the tank support structure, and the pressurization system. The changeable items in the stage would include the tank cylindrical sections, the outer shell which is load and length tailored depending on the mission, and the support rings whose size is dependent on the weight carried by the stage.

It is seen that the modular stage can thus be utilized for a wide variety of missions simply by increasing or decreasing the size of the propellant tanks by utilizing a custom tailored tank cylindrical section. The outer shell of the stage would also be custom tailored to support the desired payload weight and tank weight. The amount of design work required then for such a stage is cut to only a fraction of that which would be required if it was necessary to conceive of an entirely new unit utilizing propellant tanks as load bearing structure.

Accordingly it is an object of this invention to provide a stage for a rocket propelled space vehicle containing a maximum number of immutable items so that the design problems in creating a vehicle for a net mission will be minimized.

It is another object of this invention to provide a stage for a rocket propelled space vehicle in which the relationship of the engines to their support structure is fixed and in which the relationship of the engines to the propellant feed ducting is also fixed.

It is still another object of this invention to provide a stage for a rocket propelled space vehicle in which the relationship between the rocket engines, the propellant feed ducting to the engines, a bulkhead of the propellant storage tanks, and the engine support structure are fixed.

Yet another object of this invention is to provide a stage for a rocket propellel space vehicle in which the propellant storage tanks are supported by the structure of the stage rather than being an integral portion of the stage itself.

Still another object of this invention is to provide a stage for a rocket propelled space vehicle in which the propellant storage tank bulkheads are immutable, but in which the center sections of these tanks may be tailored to fit the particular propellant load requirements of a specific space mission.

These and other objects and advantages of this invention will be more apparent upon reference to the following specification, appended claims, and drawings wherein:

Figure 1:
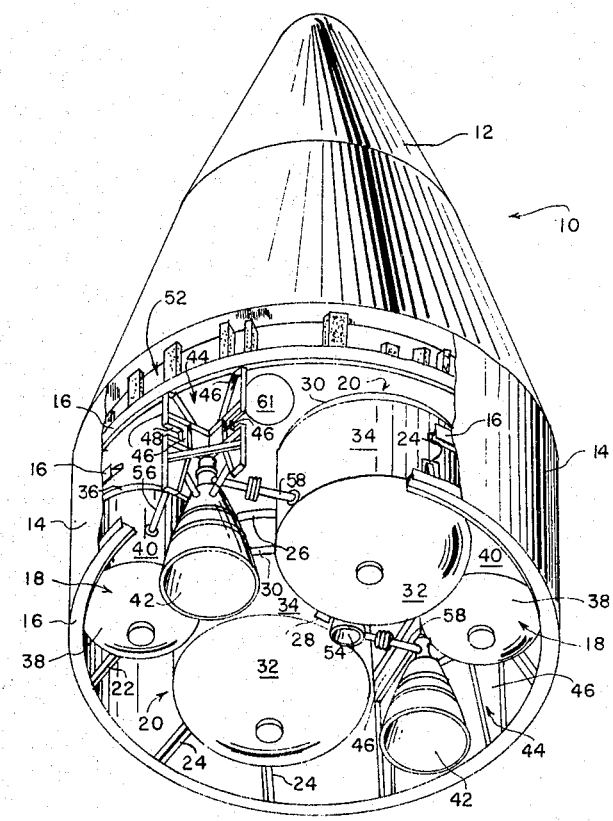
FIGURE 1 is a perspective view partly broken away showing the bottom and side of a preferred embodiment of the multi-mission stage carrying payload and a payload protecting shroud.

With continued reference to the accompanying figures wherein like numerals designate similar parts throughout the various views, and with initial attention directed to FIGURE 1, reference numeral 10 designates one form of multi-mission module supporting a payload (not shown) protected by an aerodynamic shroud 12. The module includes an outer skin 14 secured to a plurality of supporting rings 16, fuel tanks 18, and oxidizer tanks 20. The fuel tanks 18 are secured to the lower ring 16 by means of braces 22, and similarly, the oxidizer tanks 20 are secured to the lower ring 16 by braces 24. The fuel tanks 18 are secured to one another by a cross tie bar 26 while the oxidizer tanks 20 are secured to one another by a similar but shorter cross tie bar 28.

As best shown in FIGURES 1 through 5, each of the oxidizer tanks 20 is comprised of 3 sections; namely, top semi-ellipsoidal bulkhead 30, bottom semi-ellipsoidal bulkhead 32, and center cylindical section 34. Likewise, each of the fuel tanks 18 are comprised of a top semi-ellipsoidal bulkhead 36, a bottom semi-ellipsoidal bulkhead 38, and a center cylindrical section 40.

Figure 2:
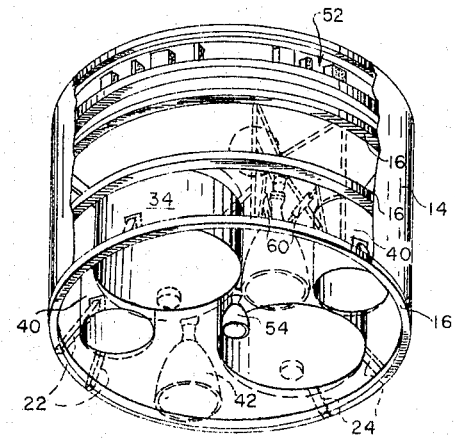
FIGURE 2 is a perscpective view of a multi-mission module and illustrating the specialized hardware items contained in that module.

The module illustrated in FIGURES 1 to 5 also includes a pair of rocket engines 42 secured to a supporting ring 16 by means of thrust structure 44 which is fabricated from a plurality of metal channels 46 welded or otherwise suitably secured together to form a strong, unitary, V-shaped structure. As best illustrated in FIGURES 1 and 2, the thrust structure frame is notched at 48 to accommodate one of the support rings 16.

Guidance of the stage is accomplished by means of an instrument unit 52. This unit includes equipment for internal and/or external control plus telemetry transmitters for sending information back to a receiving station.

The specialized items which must be specifically designed for a stage, such as that shown in FIGURE 1, are illustrated in FIGURE 2 in bold lines. These include the outer skin 14 and support rings 16 which must be tailored to accommodate the load that can consist solely of the payload or the payload and one or more stages. Ullage motors such as that identified by reference numeral 54 must be designed for the particular space mission to be undertaken, and, of course, the type of apparatus to be placed in the instrument unit 52 is almost completely dependent upon the particular mission.

As propellant requirements vary extensively from mission to mission, it is apparent that propellant volume flexibility is a highly desirable feature in a multi-mission module. Otherwise, the stage will be handicapped in certain missions by having excess tank volumes and structural weights that would result from a fixed volume design. The requisite flexibility is accomplished in the multi-mission module by custom building the center cylindrical tank sections 34 and 40 to such a length as to provide, in cooperation with bulkheads 30, 32, 36, and 38, the desired volume. Thus, a mission requiring a light payload, a small change in velocity, and of a short duration will require a small propellant tank volume and therefore relatively short center cylindrical sections. On the other hand, a mission requiring a heavy payload, a large change in velocity, and of a long duration would require a large propellant volume and hence long center cylindrical sections. Many variations and combinations of the above mission dependent factors can occur, but simply by changing the length of the center cylindrical section the propellant load requirements can be met for all conditions.

As stated before, many tank geometries may be utilized in the module. The cylindrical design has been found to be the most attractive, however, due to its greater simplicity, volumetric flexibility, fabrication ease, and known fluid dynamics and outage characteristics. In addition, the simple cylindrical tank geometry proves to be among the best from the standpoint of minimizing overall stage lengths. Stage compactness is recognized to be an especially important consideration in nearly all of the potential multi-mission module applications. This is most significantly the case in lunar logistics systems applications wherein the landing weight of the touchdown stage is intimately related and accutely sensitive to the center of mass and height of the landing vehicle at the time of lunar touchdown. All missions benefit from stage compactness, however, since adverse launch vehicle stiffness and bending frequency characteristics are less pronounced for the shorter vehicle configurations.

Figure 3:
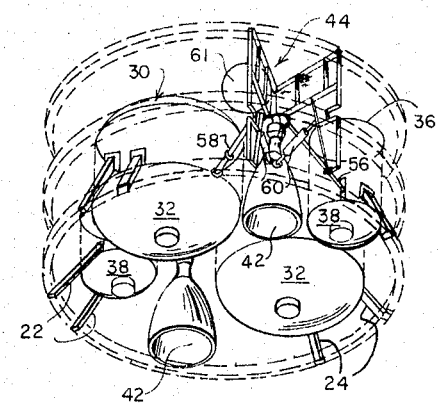
FIGURE 3 is a view similar to that of FIGURE 2 showing the immutable hardware items contained in a multi-mission module.

The immutable hardware items included in the multi-mission module are illustrated in FIGURE 3 in bold lines with the specialized support rings and cylindrical tank sections shown in broken lines. The engines 42 are standardized items with a nominal thrust level and may or may not incorporate throttling capability, depending on the mission application spectrum. Studies have indicated that the given or nominal thrust level should optimally satisfy missions in which the module is required to function in a relatively strong gravity field, such as the final or braking stage of a lunar logistics mission. The engines illustrated produce on the order of 15,000 pounds of thrust each. The other space or velocity stage applications have been observed to suffer only very slight performance penalties by standardizing on a thrust level specifically tailored to best suit the unique requirements of those applications in which gravity losses become a significant factor.

The immutable portions of the propellant tanks are the upper and lower semi-ellipsoidal bulkheads 30 and 32 respectively of the oxidizer tanks, and the upper and lower semi-ellipsoidal bulkheads 36 and 38, respectively, for the fuel tanks. Standardization of these elements is very desirable since they are difficult to construct and hence production in quantity greatly lowers the cost in accordance with the well known advantages of mass fabrication.

The rings 16 are, as described before, variable in size and strength characteristics in accordance with the mission to be performed by the module. As shown in FIGURES 2 and 3, however, the position of these rings is constant relative to the engine thrust structure and the bottom hemispheric bulkheads 32 and 38 of the tanks. Thus, the engines may be set into a stage with clearances and the possibile effect of the exhaust flame as known factors.

From the foregoing it is clear that a great number of the above described immutable items may be manufactured and stored "on the shelf." As various missions are agreed upon the required outer skin, support rings, and tank cylindrical center sections can be designed to cooperate with the immutable items. Thus, it is obvious that design costs as well as manufacturing costs will be minimized.

Figures 4, 5:
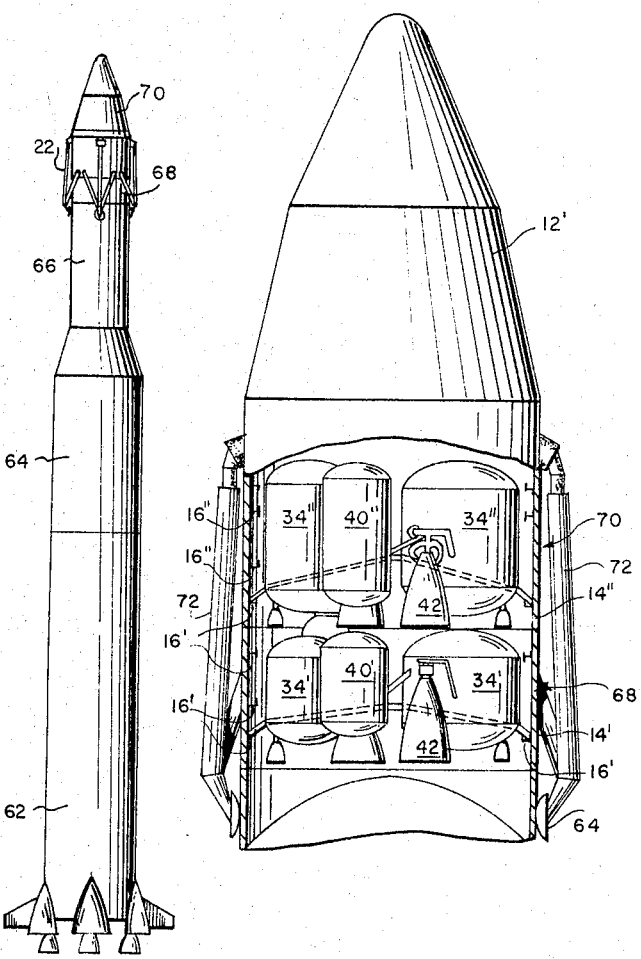
FIGURE 4 is a fragmentary side elevation, partly broken away, showing a rocket powered space vehicle having a payload protecting shroud and including a first multi-mission module stage adapted to place a payload in a lunar orbit, and a second multi-mission stage adapted to act as the breaking stage for a lunar landing.
FIGURE 5 is a side elevation of a multi-stage rocket powered space vehicle including two multi-mission module stages.

The many advantages of such a system are illustrated in FIGURES 4 and 5 wherein is shown a large multi-stage launch vehicle adapted for a mission of lunar exploration and logistics. The first stage 62 and second stage 64 are used to lift the payload from the earth into the upper atmosphere, each stage separating from the vehicle after it has performed its function. Thereafter the engines in the third stage 66 are started to place the payload into an earth parking orbit. The third stage 66 engines are inactivated after orbit is achieved and later restarted to provide power so that the vehicle will escape from earth orbit and commence the trip to the moon. The third stage 66 is then separated from the vehicle.

Mid-course corrections and injection into lunar orbit are achieved by utilizing the thrust provided by the engines 42 in a first multi-mission module 68. When lunar orbit is achieved the first module 68 is separated from the vehicle and the engines 42 in a second multi-mission module 70 function to slow the vehicle to commence descent to the lunar surface. The thrust developed by the engines 42 in the second module 70 is also used to provide hovering power and a slow, controlled landing speed. The landing gear 72 on the second module 70 is extended outwardly during the descent to function as an impact absorber for touchdown and to provide a stable base upon which the module 70 rests.

Since injection into lunar orbit requires less sustained thrust than does descent and landing, the amount of propellant loading required for the first module 68 is less than that required for the second module 70. The center cyclindrical tank sections 34' and 40' in the first module 60 are therefore shorter than the center cylindrical tank sections 34" and 40" in the second module 70 (see FIGURE 5).

On the other hand the load carried by module 70 is less than that carried by module 68 since the latter must support both the payload within shroud 12' and the entire module 70. Thus, the outer skin 14' and the support rings 16' for the first module 68 must be designed to carry more weight than the corresponding skin 14" and support rings 16" in module 70.

From the foregoing it is apparent that two stages having entirely different functions have been created using, for the greatest part, interchangeable parts. Only the outer skin, the support rings, and the center cylindrical tank section differ between the two. The savings to be realized over the usual accepted practice of designing entirely separate stages specifically tailored for a particular function is obvious. In addition, reliability of the stages is increased because of the repeated testing and extended use of the system in many other allied applications.

Figures 6, 7:
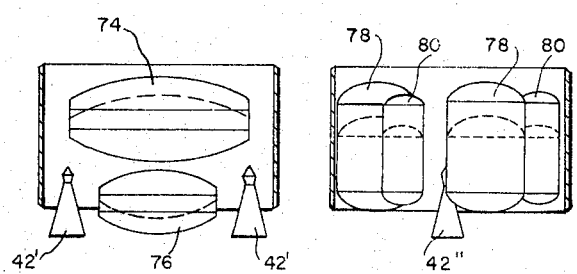
FIGURE 6 is a side elevation, partly sectional view of a multi-mission module showing a pair of extensible tanks combined with two rocket engines in a first arrangement.
FIGURE 7 is a view similar to FIGURE 6 but showing another propellant tank and engine arrangement in which a single engine is combined with two pairs of extensible tanks.
Figure 8:
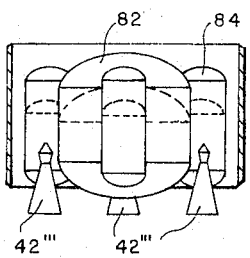
FIGURE 8 shows yet another propellant tank and engine arrangement in which three rocket engines are combined with a single large extensible tank and three smaller extensible tanks.

Several stage and propellant tank arrangements which employ the "custom length" cylindrical tank design approach are illustrated in FIGURES 6 through 8. As shown in FIGURE 6, a multi-mission module can have two engines 42' with both fed from a single oxidizer tank 74 and a single fuel tank 76. As shown in FIGURE 7, a single engine 42" may be fed from three oxidizer tanks 82 and three fuel tanks 84 may be utilized as shown in FIGURE 8. The dotted lines show the manner in which the various tanks can be shortened without disturbing the relationship of the engines, tank bottoms, and the barrel-shaped support structure.

It will be apparent that by application of the teachings contained in the foregoing specification that a stage utilizing a number of immutable items combined with items specifically tailored to a particular mission may be constructed. This stage has many advantages among which the most significant are lower design costs, lower manufacturing costs, increased reliability, and isolation of the fuel storage containers from the load bearing structure resulting in greatly simplified insulation problems. It is possible by utilizing these teachings to vary propellant loading of the module by changing the length of the center cylindrical tank sections. This may be done without affecting the engines, engine thrust structure, piping from the tanks to the engines, fill and vent lines, and so forth. The use of a "standardized" module is a vast improvement over the usually accepted method of designing from the "ground up" a completely new stage to fulfill the needs of perhaps only one specific mission. It is obvious that this invention will result in greatly reduced costs for the national space program.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of these claims are therefore intended to be embraced therein.

What is claimed and desired to be secured by United States Letters Patent is:

1. In a space vehicle carrying a payload having specific size and weight characteristics, a stage comprising:
  (a) an immutable first group of elements including
    (1) a plurality of rocket engines;
    (2) thrust transmitting structure secured to each of said rocket engines;
    (3) said thrust transmitting structure comprising a framework joined to said rocket engines and projecting toward the periphery of said stage;
    (4) a plurality of propellant container bulkheads;
    (5) conduit means connected to said rocket engines;
  (b) a specialized second group of elements including
    (1) a load bearing structure designed specifically to support said payload;
    (2) said load bearing structure including a plurality of supporting rings encircling said first group of elements;
    (3) means for joining selected pairs of said container bulkheads to form closed containers the capacity of which may be varied by changing the size of said means to thereby provide a means for varying propellant loadings;
    (4) means interconnecting said conduit means and said containers;
  (c) means for securing said framework of said thrust transmitting structure to at least one of said supporting rings;
  (d) means for securing the closed containers formed by said bulkheads and said joining means to at least one of said supporting rings.

2. A space vehicle capable of carrying a payload which will vary in size and weight depending upon its mission, a stage of said vehicle comprising:
  (a) an immutable first unit including
    (1) a plurality of rocket engines;
    (2) thrust transmitting structure secured to each of said rocket engines;
    (3) said thrust transmitting structure comprising a framework joined to said rocket engines and extending toward the periphery of said stage;
    (4) a plurality of spaced-apart axially aligned propellant container bulkheads;
    (5) conduit means interconnected with said rocket engines for supplying propellants to the combustion chambers of respective rocket engines;
  (b) a specialized second group of elements including (1) a load bearing structure designed specifically to support the weight of the particular payload utilized;
(2) said load bearing structure including a plurality of supporting rings encircling said first unit;
(3) container section means capable of being varied in size to enclose differing volumes joining said container bulkheads to form propellant containers whereby the vehicle may be easily modified to accomplish different missions requiring different propellant loading;

(c) means for securing said framework of said thrust transmitting structure to at least one of said supporting rings;

(d) means for securing said propellant containers to at least one of said supporting rings.

References Cited by the Examiner
UNITED STATES PATENTS 2,986,004 5/1961 McKenney _____ 60—35.6
3,024,596 3/1962 Hatfield _____ 102—49

OTHER REFERENCES

Alexander, George: Gemini Design Keyed to Mission Flexibility, in Aviation Week and Space Technology, pp. 52–59, 62, 65, 66, 71, 73, 75, 77, 81 and 83 relied upon, May 13, 1963.

References Cited by the Applicant
UNITED STATES PATENTS 1,818,138 8/1931 Howland.
2,870,710 1/1959 Miedel.
3,088,273 5/1963 Adelman et al.

BENJAMIN A. BORCHELT, *Primary Examiner.*

SAMUEL FEINBERG, *Examiner.*

V. R. PENDEGRASS, *Assistant Examiner.*